United States Patent
Wang et al.

(10) Patent No.: US 8,512,627 B2
(45) Date of Patent: Aug. 20, 2013

(54) METHOD FOR THE PRODUCTION OF AN ASYMMETRIC HOLLOW FIBER MEMBRANE

(75) Inventors: Rong Wang, Singapore (SG); David Tee Liang, Singapore (SG); Joo Hwa Tay, Singapore (SG)

(73) Assignee: Nanyang Technological University, Singapore (SG)

( * ) Notice: Subject to any disclaimer, the term of this patent is extended or adjusted under 35 U.S.C. 154(b) by 269 days.

(21) Appl. No.: 12/866,251

(22) PCT Filed: Feb. 4, 2009

(86) PCT No.: PCT/SG2009/000041
§ 371 (c)(1),
(2), (4) Date: Aug. 5, 2010

(87) PCT Pub. No.: WO2009/099396
PCT Pub. Date: Aug. 13, 2009

(65) Prior Publication Data
US 2011/0033645 A1    Feb. 10, 2011

(30) Foreign Application Priority Data
Feb. 5, 2008  (SG) .................................. 200801008

(51) Int. Cl.
*D01D 5/24* (2006.01)
*D01F 1/08* (2006.01)

(52) U.S. Cl.
USPC ........ 264/558; 264/184; 264/203; 264/209.1; 264/211; 264/559; 264/561; 264/562; 264/563

(58) Field of Classification Search
USPC .................... 264/41, 178 R, 178 F, 183, 184, 264/203, 209.1, 211, 557, 558, 559, 561, 264/562, 563
See application file for complete search history.

(56) References Cited

U.S. PATENT DOCUMENTS

| | | | | |
|---|---|---|---|---|
| 5,762,798 A | * | 6/1998 | Wenthold et al. | 264/178 F X |
| 2003/0038074 A1 | * | 2/2003 | Patil | 210/321.74 |
| 2009/0130321 A1 | * | 5/2009 | Liu | 264/41 X |

FOREIGN PATENT DOCUMENTS

| | | |
|---|---|---|
| JP | 60097001 A | 5/1985 |
| KR | 20060022866 A | 3/2006 |
| KR | 20070113375 A | 11/2007 |

* cited by examiner

*Primary Examiner* — Leo B Tentoni
(74) *Attorney, Agent, or Firm* — Jacobson Holman PLLC

(57) ABSTRACT

The present invention provides a method for the production of a poly(vinylidene fluoride-co-hexafluoropropylene) (PVDF-HFP) asymmetric hollow fiber membrane. The invention comprises preparing a dope solution of PVDF-HFP with an additive of lithium chloride or glycerol dissolved in a solvent such as N-methylpyrollidone (NMP). The dope solution is spun to form a PVDF-HFP asymmetric hollow fiber membrane.

11 Claims, 1 Drawing Sheet

METHOD FOR THE PRODUCTION OF AN ASYMMETRIC HOLLOW FIBER MEMBRANE

CROSS-REFERENCE TO RELATED APPLICATIONS

The present patent application is a nationalization of International application No. PCT/SG2009/000041, filed Feb. 4, 2009, published in English, which is based on, and claims priority from, Singapore Application No. 200801008-4, filed Feb. 5, 2008, both of which are incorporated herein by reference in their entireties.

FIELD OF THE INVENTION

The present invention relates to a method for the production of an asymmetric hollow fiber membrane. More particularly, the invention relates to a method for the production of a poly(vinylidene fluoride-co-hexafluoropropylene) (PVDF-HFP) asymmetric hollow fiber membrane.

BACKGROUND TO THE INVENTION

The homopolymer polyvinylidene fluoride (PVDF) has received much attention as a material for use in the production of hydrophobic polymeric membranes. PVDF has good chemical and thermal resistances, and asymmetric membranes can be produced using PVDF via phase inversion method. Thus membranes produced using PVDF have been used in a number of separation applications including membrane distillation, pervaporation and gas absorption. However problems have been encountered with PVDF membranes, one of which is that the hydrophobicity of PVDF membranes is not sufficiently high which has resulted in them being unable to sustain long term performance.

There has been recent interest in the use of the copolymer poly(vinylidene fluoride-co-hexafluoropropylene) (PVDF-HFP) as a membrane material. In contrast to polyvinylidene fluoride (PVDF), PVDF-HFP possesses lower crystallinity and higher free volume due to the incorporation of an amorphous phase of hexafluoropropylene (HFP) into the main constituent vinylidene fluoride (VDF) blocks. Furthermore, the addition of the HFP group increases the fluorine content and makes PVDF-HFP more hydrophobic than PVDF. The strong hydrophobicity of PVDF-HFP makes this material suitable in a range of applications. Thus PVDF-HFP is suitable as a material to make membranes for use in the applications of membrane distillation, pervaporation separation, and membrane contactors.

Most of the work to date on PVDF-HFP membrane preparation has related to flat sheet membranes. For example, a liquid extraction/activation method using a volatile plasticizer was developed by Bellcore to make microporous PVDF-HFP films. Later the phase inversion method with different dope systems was adopted to cast PVDF-HFP flat sheet membranes. Further work led to the proposal that carbon dioxide be used as the non-solvent for ease of solvent recovery during the phase inversion of PVDF-HFP flat sheet membrane preparation.

However there have been few reports on the preparation of PVDF-HFP hollow fiber membranes. This may be due to the fact that PVDF-HFP is generally not intended for use as a membrane material for separation purposes. In addition, hollow fiber fabrication is a more complicated process involving various factors including phase inversion kinetics and two coagulation processes. In contrast to flat sheet configuration, an important advantage of hollow fiber membranes is that hollow fibers can be used to form compact modules with very high membrane surface areas, which is favourable for practical applications.

In work leading up to the invention, the inventors successfully fabricated PVDF-HFP asymmetric microporous hollow fiber membranes using a non-solvent induced phase inversion method. However it was found that the pure water flux of the hollow fiber membranes made by PVDF-HFP/N-Methyl-2-pyrrolidone (NMP) dope solutions without an additive was quite small, even though a low polymer concentration (15 weight %) was used. The addition of polyvinylpyrrolidone) (PVP) as an additive into the dope solution was tested which was believed to promote the formation of macrovoids in the membrane, and the pure water flux was thus increased. However there was a need to further improve the structure and performance of the membranes produced. It was believed that by using a suitable additive as a pore former to adjust the membrane structure, the permeation performance of the hollow fiber membranes could be improved.

It was against the above background that the present invention has been devised.

References to prior art in this specification are provided for illustrative purposes only and are not to be taken as an admission that such prior art is part of the common general knowledge in Singapore or elsewhere.

SUMMARY OF THE INVENTION

According to one aspect of the present invention there is provided a method for the production of a poly(vinylidene fluoride-co-hexafluropropylene) (PVDF-HFP) asymmetric hollow fiber membrane comprising:
  a) preparing a dope solution comprising PVDF-HFP, an additive, and a solvent, the PVDF-HFP and the additive having been dissolved in the solvent; and
  b) spinning the dope solution to form the PVDF-HFP asymmetric hollow fiber membrane.

The additive is preferably a water soluble or water miscible compound.

The additive is preferably a low molecular weight salt.

The additive is preferably an ionic lithium compound such as lithium chloride.

As an alternative, the additive may be a weak non-solvent. Still more preferably the additive is glycerol.

Preferably the concentration of PVDF-HFP in the dope solution ranges from about 13 to 30 weight %, and more preferably from about 15 to 20 weight %.

Lithium Chloride used as an additive is typically present in a concentration ranging from about 0.1 to 15 weight %. Glycerol used as an additive is typically present in a concentration ranging from about 0.1 to 20 weight %.

The dope solution is preferably formed by dissolving PVDF-HFP in a dipolar aprotic solvent. The dipolar aprotic solvent is preferably N-Methyl-2-pyrrolidone (NMP).

The dope solution preferably comprises PVDF-HFP and lithium chloride (as the additive) dissolved in NMP. More preferably the dope solution comprises 15 weight % PVDF-HFP and 4 weight % lithium chloride dissolved in NMP.

The dope solution preferably comprises PVDF-HFP dissolved in NMP with glycerol as additive. More preferably the dope solution comprises 15 weight % PVDF-HFP with 10 weight % glycerol dissolved in NMP.

The step of spinning the dope solution preferably comprises the step of fabrication of the membrane.

Preferably the step of spinning is carried out by one or both of wet or dry-jet spinning processes.

The present invention further provides a poly(vinylidene fluoride-co-hexafluoropropylene) (PVDF-HFP) asymmetric hollow fiber membrane prepared according to the method of the invention.

Each hollow fiber preferably has an outer diameter of from about 500 μm to 3000 μm, and more preferably from 800 μm to 1200 μm. Each hollow fiber preferably has an inner diameter of from about 300 μm to 1000 μm, and more preferably from 400 μm to 700 μm.

Preferably the cross section of each of the hollow fibers of the poly(vinylidene fluoride-co-hexafluoropropylene) (PVDF-HFP) asymmetric hollow fiber membrane is substantially circular. However, the cross section may also be substantially square, rectangular or hexagonal.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of the method for the production of a poly(vinylidene fluoride-co-hexafluoropropylene) (PVDF-HFP) asymmetric hollow fiber membrane, given by way of example only, with reference to the accompanying drawings, in which.

DETAILED DESCRIPTION OF PREFERRED EMBODIMENTS

The nature of the invention will be better understood from the following detailed description of several specific embodiments of the method for the production of a poly(vinylidene fluoride-co-hexafluropropylene) (PVDF-HFP) asymmetric hollow fiber membrane.

Figure 1:
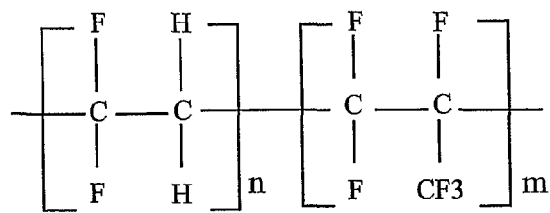
FIG. 1 is a diagram of the chemical structure of PVDF-HFID.
Figure 2:
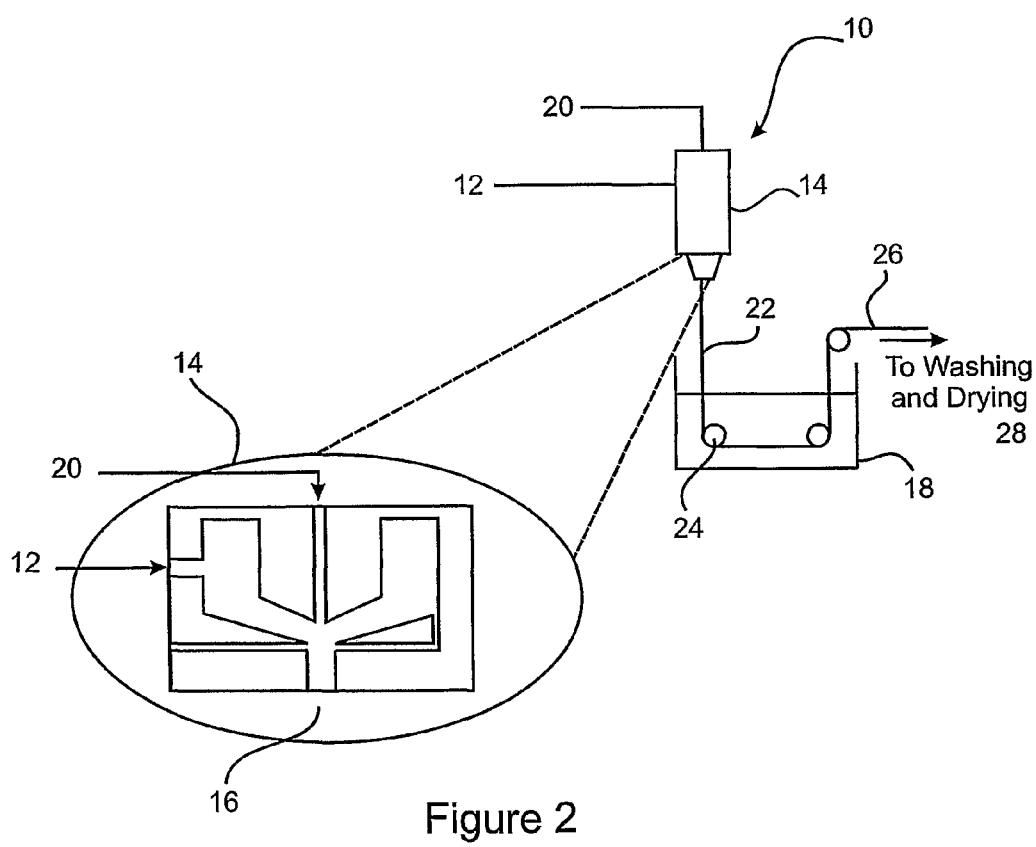
FIG. 2 is a schematic diagram of a hollow fiber spinning line used in the method of the present invention.

FIG. 1 shows the chemical structure of PVDF-HFP with the hexafluoropropylene (HFP) group; and FIG. 2 shows a diagram of a hollow fiber spinning line used in the method of the present invention.

Hollow fiber spinning is well known in the art and has been reported in detail in "Fabrication of 6FDA-Durene Polyimide Asymmetric Hollow Fibers for Gas Separation" by R. Wang et al. in Journal of Applied Polymer Science, Vol. 82, 2166-2173 (2001).

The technique of hollow fiber spinning will now be described as it has been applied in the present invention and as it is used in the Examples which follow. FIG. 2 shows a hollow fiber spinning line 10. A dope solution 12 was formed of PVDF-HFP with an additive dissolved in NMP. The dope solution 12 was dispensed under pressure through a spinneret 14 at a controlled rate, and passed through an air gap 16 before immersing into a coagulation bath 18. Tap water was used as external coagulant while the mixtures of Milli-Q Water and NMP in different ratios were used as the bore fluid 20. The nascent hollow fiber 22 was taken up by a roller 24 at a free falling velocity and then passed to a washing and drying step 28. The resulting membrane 26 was stored in a water bath to remove residual for at least 2 days. In order to alleviate membrane shrinkage during the drying process at ambient conditions, the membrane 26 was immersed in turn into water/1-propanol (1:1), 1-propanol, 1-propanol/n-hexane (1:1) respectively over 24 hours.

The concentration of PVDF-HFP in the dope solutions ranged from about 13 to 30 weight %, and preferably from about 15 to 20 weight %. Lithium chloride (LiCl) used as an additive was typically present in a concentration ranging from 0.1 to 15 weight %. Glycerol used as an additive was typically present in a concentration ranging from 0.1 to 20 weight %. The bore fluid 20 comprised a mixture of NMP and water of certain weight ratios of between 0/100 and 80/20.

The temperature of the spinneret was controlled between about 20° C. and 60° C. The air gap 16 was set from about 0.2 to 40 cm. The resulting hollow fiber had an outer diameter of from 500 μm to 3000 μm, more preferably from 800 μm to 1200 μm, and an inner diameter of from 300 μm to 1000 μm, more preferably from 400 μm to 700 μm. The present invention will now be further described by way of the following examples.

Example 1

PVDF-HFP Hollow Fiber Membranes Made from PVDF-HFP/NMP/LiCl Dope Solutions

LiCl was selected as an additive added to form the polymer dope solutions. Dopes made from 15 wt. % PVDF-HFP in NMP with 4 wt. % LiCl were used as the spinning solutions. The bore fluid composition used was water with a flow rate of 2.5 ml/min, while the fiber take-up speed was free falling velocity. Tap water with room temperature around 25° C. was used as the coagulant. The air gap used was 20 cm. The details of dry-jet wet spinning conditions are listed in Table 1.

TABLE 1

| Spinning parameters for PVDF-HFP hollow fibers | |
|---|---|
| Spinneret dimension | OD = 1.7 mm, ID = 0.7 mm |
| Dope solution flow rate (g/min) | 5.5 |
| Coagulant | water |
| Coagulant temperature (° C.) | 25 |
| Bore fluid composition | water |
| Bore fluid flow rate (mL/min) | 2.5 |
| Air gap (cm) | 15 |
| Take-up speed | Free falling velocity |
| Ambient temperature (° C.) | 25 |
| Room humidity (%) | 80 |

After post-treatment, the hollow fiber membranes were subsequently dried at room temperature before characterization tests. The lab-scale modules were prepared by sealing 15 pieces of fibers into a glass tube with a length of 30 cm. The effective length of the fibers in the glass module was 25 cm.

The test modules were used to measure pure water permeability (PWP) by circulating Mili-Q ultrapure water through the shell side of the membrane modules under 1 atm pressure. The membrane separation characteristics were tested using approximately a 1500 ppm dextran aqueous solution. The dextran solution contained a broad molecular weight distribution from 1,500 to 400,000 Dalton and was circulated through the shell side of the membrane modules. The molecular weight cut-off (MWCO) of asymmetric hollow fiber membranes is defined as the molecular weight at 90% rejection. The details were described clearly in "Development of a novel electrophoresis-UV grafting technique to modify PES UF membranes used for NOM removal" by X. Wei, R. Wang, Z. Li and A. G. Fane in Journal of Membrane Science, 273 (2006) 47.

The dynamic contact angles of the hollow fibers were measured using a tensiometer (DCAT11 Dataphysics, Germany) to determine the hydrophobic properties of the fibers. A sample fiber glued to the hold was hung from the arm of an electro balance, and it then experienced a cycle of immersion into DI water and successive emersion. The weight difference was continuously recorded by the electro-balance during the above loop at an interfacial moving rate of 0.2 mm/min and an immersion depth of 5 mm. Tensile strength testing of the membranes was carried out using an Instron 5542 tensile test machine at room temperature and humidity of around 75%. Table 2 summarizes the dimension and performance of the hollow fiber membranes.

For comparison, the dimension and performance of the hollow fibers made from PVDF-HFP/NMP/PVP dope solutions are given in Table 4. It is well recognized that the membrane pore size distribution is very important to determine the membrane performance. The addition of 4 wt. % LiCl or 10% glycerol into the dope solution forms membranes with narrower pore size distribution, which can be reflected from the data of PWP and MWCO. For instance, the PWP of the membrane with 5 wt. % PVP as an additive was 42 L/h·m²·atm with 150 kDa MWCO, whereas the membrane with 10 wt. % glycerol as an additive had a PWP value of 51 L/h·m²·atm with 100 kDa MWCO. The membrane made with 4 wt. % LiCl in the dope had PWP of 33 L/h·m²·atm and a best retention of 40 kDa MWCO. Moreover, the addition of LiCl or glycerol into the dope solution made the membrane exhibit stronger mechanical strength than the membrane made with PVP as an additive. Besides, the hydrophobicity of the PVDF-HFP membranes was found to be reduced when PVP was used as the additive for membrane fabrication because of its residues trapped in the polymer matrix, but the hydrophobic property of the membranes was less affected by the additives LiCl and glycerol.

TABLE 2

Dimension and performance of the hollow fibers made from PVDF-HFP/NMP/LiCl dope solutions

| Dope composition | Mean OD/ID (μm) | PWP (L/(hr · m² · atm) | MWCO (KDa) | Dynamic contact angle (°) | | Mechanical strength | |
|---|---|---|---|---|---|---|---|
| PVDF-HFP/ NMP/LiCl (15 wt. %/ 81 wt. %/ 4 wt. %) | 1061/677 | 33 | 40 | First cycle | 90.9 | Extension at break (%) | 400 |
| | | | | Second cycle | 78.2 | Tensile stress at break (Mpa) | 3.3 |
| | | | | Third cycle | 76.7 | Young's modulus (Mpa) | 117 |

Example 2

PVDF-HFP Hollow Fiber Membranes Made from PVDF-HFP/NMP/Glycerol Dope Solutions Glycerol was selected as an additive added to form the polymer dope solutions. Dope solutions made from 15 wt. % PVDF-HFP in NMP with 10 wt. % glycerol were used as the spinning solutions. The bore fluid composition used was water with a flow rate of 2.5 ml/min, while the fiber take-up speed was free falling velocity. Tap water with room temperature around 25° C. was used as the coagulant. The air gap used was 20 cm. Other spinning conditions were similar to that in Example 1.

The membranes were characterized using the same methods described in Example 1. The dimension and performance of the hollow fiber membranes are given in Table 3.

TABLE 3

Dimension and performance of the hollow fibers made from PVDF-HFP/NMP/glycerol dope solutions

| Dope composition | Mean OD/ID (μm) | PWP (L/(hr · m² · atm) | MWCO (KDa) | Dynamic contact angle (°) | | Mechanical strength | |
|---|---|---|---|---|---|---|---|
| PVDF-HFP/ NMP/glycerol (15 wt. %/ 75 wt. %/ 10 wt. %) | 1032/624 | 51 | 100 | First cycle | 90.2 | Extension at break (%) | 502 |
| | | | | Second cycle | 89.0 | Tensile stress at break (Mpa) | 2.6 |
| | | | | Third cycle | 88.3 | Young's modulus (Mpa) | 56.2 |

TABLE 4

Dimension and performance of the hollow fibers made from PVDF-HFP/NMP/PVP dope solutions*

| Dope composition | Mean OD/ID (μm) | PWP (L/(hr·m²·atm) | MWCO (KDa) | Dynamic contact angle (°) | | Mechanical strength | |
|---|---|---|---|---|---|---|---|
| PVDF-HFP/ NMP/PVP (15 wt. %/ 80 wt. %/ 5 wt. %) | 971/566 | 42 | 150 | First cycle | 91.5 | Extension at break (%) | 282 |
| | | | | Second cycle | 78.2 | Tensile stress at break (Mpa) | 2.3 |
| | | | | Third cycle | 76 | Young's modulus (Mpa) | 40 |

*L. Shi, R. Wang, Y. M. Cao, C. S. Feng, D. T. Liang, J. H. Tay, Fabrication of Poly(vinylidene fluoride-co-hexafluropropylene) (PVDF-HFP) Asymmetric Microporous Hollow Fiber Membranes J. Membr. Sci., 305 (2007) 215-225

Example 3

PVDF-HFP Hollow Fiber Membranes Made from PVDF-HFP/NMP/No Additive Solutions For comparison, the dimension and performance of the hollow fibers made from PVDF-HFP/no additive dope solutions are given in Table 5. By the addition of certain additives, the inventors found that the properties of the poly(vinylidene fluoride-co-hexafluoropylene) (PVDF-HFP) asymmetric hollow fiber membranes prepared according to the method of the invention were improved, such as by way of an increase in the pure water flux and higher porosity, as compared to membranes prepared without the inclusion of an additive, shown in Table 5. The inventors believed that in order to improve the permeation performance of PVDF-HFP asymmetric hollow fiber membranes, additives were required in the production step.

TABLE 5

Dimension and performance of the hollow fibers made from PVDF-HFP/NMP/no additive dope solutions*

| Dope composition | Mean OD/ID (μm) | PWP (L/(hr·m²·atm) | MWCO (KDa) | Dynamic contact angle (°) | | Mechanical strength | |
|---|---|---|---|---|---|---|---|
| PVDF-HFP/ NMP (15 wt. %/ 85 wt. %) | 933/648 | 7 | 10 | First cycle | 101.2 | Extension at break (%) | 502 |
| | | | | Second cycle | 93.2 | Tensile stress at break (Mpa) | 2.7 |
| | | | | Third cycle | 91.8 | Young's modulus (Mpa) | 60 |

*L. Shi, R. Wang, Y. M. Cao, C. S. Feng, D. T. Liang, J. H. Tay, Fabrication of Poly(vinylidene fluoride-co-hexafluropropylene) (PVDF-HFP) Asymmetric Microporous Hollow Fiber Membranes J. Membr. Sci., 305 (2007) 215-225

The present invention is based on the surprising and unexpected finding that when compounds such as lithium chloride and/or glycerol are used as additives in the method of the invention the resulting poly(vinylidene fluoride-co-hexafluoropropylene) (PVDF-HFP) asymmetric hollow fiber membranes have enhanced properties, namely higher pure water flux and higher porosity. Without wishing to be limited by theory, the inventors believe that at least some of these additives either on their own or in combination with other compounds may act as pore formers to improve the permeation performance of the final membrane and to assist in adjusting the final membrane structure.

It is well recognized that the formation of asymmetric membranes depends on both thermodynamic and kinetic parameters. The structure change of the membrane made by PVDF-HFP/NMP without and with LiCl as an additive was believed to be associated with the change of the thermodynamic and kinetic properties of the system before and after LiCl addition. LiCl has good affinity with water. It is believed that LiCl addition increases the dope solution's thermodynamic instability on reaction with water, which facilitates a rapid phase demixing and results in macrovoid formation. On the other hand, LiCl possesses strong interactions with the polymer and solvent, which was supported by the significant increase in viscosity of LiCl added PVDF-HFP/NMP dope solutions (from 1270 cp without an additive to 8600 cP with 4 wt. % LiCl). The strong interactions among the components during spinning of the dope solution tended to delay the dope precipitation (the kinetic effect), which partially offset the thermodynamic impact of LiCl addition. As a result, the size of the macrovoids was reduced. Thus LiCl used as an additive produces membranes with a narrower pore size distribution as compared with other additives such as PVP.

For an additive with a weak non-solvent nature such as glycerol, in general, its presence in the dope solution brought the initial composition of the dope solution closer to the bimodal. Consequently, the phase inversion during the membrane formation was accelerated, which enhanced the tendency of the macrovoids' growth. In terms of the kinetic effect, the presence of 10 wt. % glycerol increased the dope solution viscosity from 1720 to 4340 cP. This change was not as significant when compared with the impact of 4 wt. % LiCl addition on the dope solution viscosity (increased to 8600 cP). The thermodynamic effect of glycerol addition would appear to play a dominant role in determining the membrane structure.

Now that several embodiments of the method for the production of a poly(vinylidene fluoride-co-hexafluoropropylene) (PVDF-HFP) asymmetric hollow fiber membrane have been described in detail, it will be apparent that the described embodiments of the method provide a number of advantages compared with the prior art, including the following:

(i) The membranes produced according to the method have improved properties of permeation performance.

(ii) The membranes produced according to the method have improved pure water flux.

It will be readily apparent to persons skilled in the relevant arts that various modifications and improvements may be made to the foregoing embodiments, in addition to those already described, without departing from the basic inventive concepts of the present invention. For example, other additives that are water soluble and can act as pore formers may be suitable for use in the method of the invention.

Therefore, it will be appreciated that the scope of the invention is not limited to the specific embodiments described and is to be determined from the appended claims.

The invention claimed is:

1. A method for the production of a poly(vinylidene fluoride-co-hexafluoropropylene) (PVDF-HFP) asymmetric hollow fiber membrane comprising:
   a) preparing a dope solution comprising PVDF-HFP, an additive, and a solvent, the PVDF-HFP and the additive having been dissolved in the solvent; and
   b) spinning the dope solution to form the PVDF-HFP asymmetric hollow fiber membrane,
wherein the additive is lithium chloride, and the concentration of lithium chloride in the dope solution ranges from about 0.1 to 15 weight %.

2. A method for the production of a PVDF-HFP asymmetric hollow fiber membrane as defined in claim 1 wherein the concentration of PVDF-HFP in the dope solution ranges from about 13 to 30 weight %.

3. A method for the production of a PVDF-HFP asymmetric hollow fiber membrane as defined in claim 2 wherein the concentration of PVDF-HFP in the dope solution ranges from about 15 to 20 weight %.

4. A method for the production of a PVDF-HFP asymmetric hollow fiber membrane as defined in claim 1 wherein the dope solution is formed by dissolving PVDF-HFP in a dipolar aprotic solvent.

5. A method for the production of a PVDF-HFP asymmetric hollow fiber membrane as defined in claim 4 wherein the dope solution is formed by dissolving PVDF-HFP in N-Methyl-2-pyrrolidone (NMP).

6. A method for the production of a PVDF-HFP asymmetric hollow fiber membrane as defined in claim 1 wherein the dope solution comprises PVDF-HFP and lithium chloride dissolved in NMP.

7. A method for the production of a PVDF-HFP asymmetric hollow fiber membrane as defined in claim 6 wherein the dope solution comprises 15 weight % PVDF-HFP and 4 weight % lithium chloride dissolved in NMP.

8. A method for the production of a PVDF-HFP asymmetric hollow fiber membrane as defined in claim 1 wherein the step of spinning the dope solution comprises the step of fabrication of the membrane.

9. A method for the production of a PVDF-HFP asymmetric hollow fiber membrane as defined in claim 1 wherein the step of spinning is carried out using a hollow fiber spinning line with a spinneret having a temperature of about 20° C. to 60° C.

10. A method for the production of a PVDF-HFP asymmetric hollow fiber membrane as defined in claim 1 wherein the step of spinning is carried out by one or both of wet or dry-jet spinning processes.

11. A method for the production of a PVDF-HFP asymmetric hollow fiber membrane as defined in claim 9 wherein the hollow fiber spinning line has an air gap of about 0.2 to 40 cm.

* * * * *